(No Model.)
2 Sheets—Sheet 1.
L. MILLER.
WIRE TIGHTENER FOR BALES AND BUNDLES.
No. 260,702.   Patented July 4, 1882.
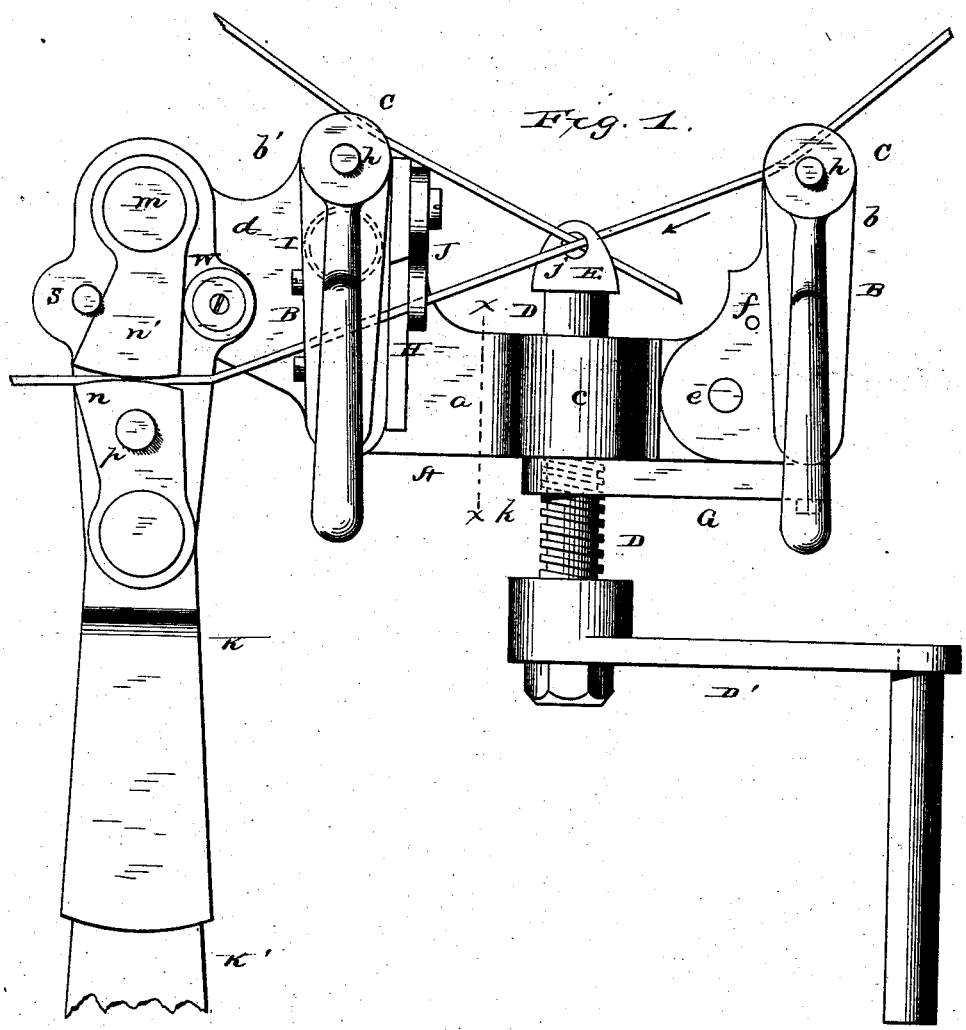
Witnesses:
Edwin L. Yewee,
J. J. McCarthy.
Inventor:
Lewis Miller,
By C. M. Alexander,
his Attorney.

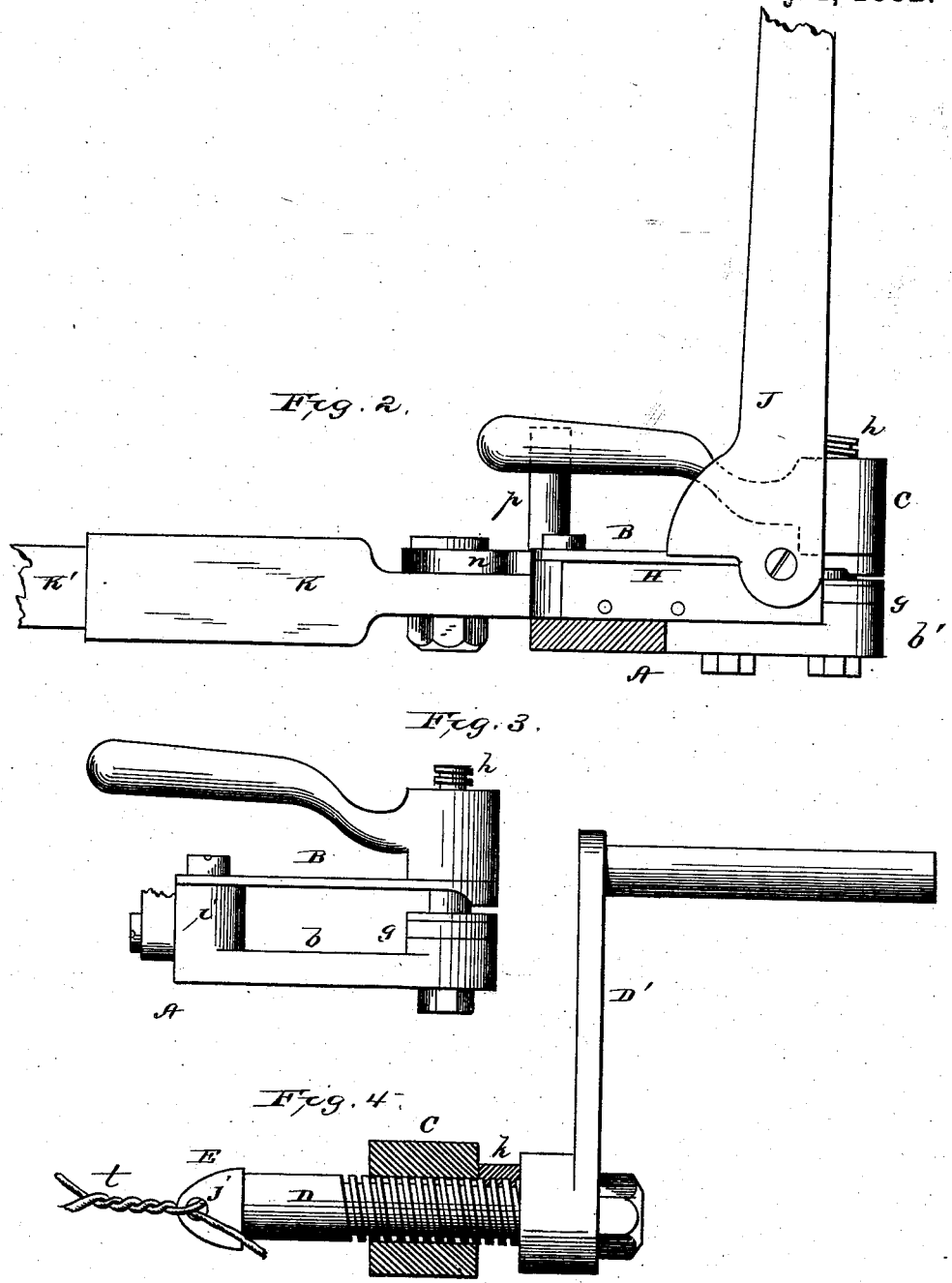

UNITED STATES PATENT OFFICE.

LEWIS MILLER, OF PHILADELPHIA, PENNSYLVANIA, ASSIGNOR TO THE VERREE IRON COMPANY, OF SAME PLACE.

WIRE-TIGHTENER FOR BALES AND BUNDLES.

SPECIFICATION forming part of Letters Patent No. 260,702, dated July 4, 1882.

Application filed February 15, 1882. (No model.)

*To all whom it may concern:*

Be it known that I, LEWIS MILLER, of Philadelphia, in the county of Philadelphia, and in the State of Pennsylvania, have invented certain new and useful Improvements in Wire Tighteners and Tyers for Bales and Bundles; and I do hereby declare that the following is a full, clear, and exact description thereof, reference being had to the accompanying drawings, and to the letters of reference marked thereon, making a part of this specification.

This invention relates to improvements on machines which are designed for securing wire bands around cotton and hay bales and bundles of all kinds; and the nature of my invention consists in certain novel devices hereinafter explained, whereby wire from a reel can be forcibly drawn about a bale or bundle and cut off and tied by means of a twist, as will be understood from the following description when taken in connection with the accompanying drawings.

In the drawings, Figure 1 is a front view of my improved wire tightener and tyer, showing a wire in position to be cut off and twisted to form the tie. Fig. 2 is a cross-section through Fig. 1 in the plane indicated by dotted line $x$ $x$. Fig. 3 is an end view of one of the clamping devices for the wire band. Fig. 4 is a view of the rotary twister and its nut, showing a twisted tie.

Similar letters of reference indicate corresponding parts.

The frame A of the machine consists of a central portion, $a$, connecting two offsets, $b$ $b'$, which are at right angles to said portion, a centrally smooth bored hub or bearing, $c$, and an extension, $d$, on one end of the frame. This frame A may be cast of one piece; but I prefer to cast the offset $b'$ separate and pivot it at $e$, as shown in Fig. 1. If desired, this offset $b'$ may be made rigid with the main part of the frame by means of a pin. The two offsets or arms $b$ $b'$ are cast with bosses or anvils $g$, which may be faced with steel, and through which pass screws $h$, that also pass freely through the ends of springs B and receive lever-nuts C C' on their screw-threaded portions. The springs B are rigidly secured to bosses $i$, rising from and cast on the frame A at the angles thereof. The free ends of the springs rise from their respective angles when the lever-nuts are unscrewed a few turns, and when a wire is introduced between the said nuts and their anvils, as shown in Fig. 1, and the nuts are screwed down tightly, the wire will be rigidly held. I have thus combined with the frame A two wire-clamps which are about equidistant from the smooth-bored hub or bearing $c$.

D designates the cylindrical shaft or spindle, on one end of which is a flat arrow-head twister, E, through which an eye, $j$, is made to receive the baling-wire when passed around the bale or bundle. The opposite end of the shaft D has a hand-lever, D', secured to it, by which this shaft can be turned to put the twisted tie $t$ in the wire after it has been drawn sufficiently tight around the bale or bundle and severed from the wire running from a reel, if a reel be used. Part of the shaft D has a screw-thread in it, the pitch of which will vary according to the size or gage of wire used for baling or bundling.

G designates an arm, which is pivoted to the frame A and constructed with a half-nut, $k$, on its free end, adapted to engage with the screw-thread on the shaft D, and which will engage with this threaded portion of the shaft when arm G is adjusted as shown in Figs. 1 and 4. When the nut-arm is disengaged from the screw-shaft this shaft can be moved endwise through its hub $c$ without turning the former.

H designates a cutting or shear plate, which is rigidly secured to the frame A alongside of the offset $b'$, and to which is suitably pivoted a lever-shear, J, the cutter of which operates in combination with the shear-plate H to sever the wire band after it has been properly tightened around the bale or bundle and its ends confined by the two clamps above described.

K designates a socket, in which is secured a lever, K', of suitable length. This socket is connected to the extension $d$ of the frame A at $m$.

On the face of the socket K are pivoted two gripping-segments, $n$ $n'$, the free ends of which are grooved slightly to form a firm embracing bite on the wire passed between them, as shown in Fig. 1. These pivoted segments form, in fact, toggles, which operate eccentrically on the wire, and effectually prevent slipping during the act of using the lever K' for tightening the wire around a bale.

The gripping-segment n is provided with a handle, p, for adjusting it quickly, and the segment n' is provided with a stop, s, fixed into the socket-piece K on one side of it, and an elastic cushion, m, applied on the opposite side or edge of it, as clearly shown in Fig. 1. The stop and spring-cushion limit the movement of the segment n', and the spring-cushion operates by its recoil to quickly free the wire from the grip or bite of the segments n n' when it is desired to release the wire to take another hold during the operation of drawing tight the wire around a bale or bundle.

The operation of the machine is as follows: A wire is drawn around a bale and passed through the eye of the twister, as shown in Fig. 1. That portion of the wire which passes from the twister to the reel crosses the shear-plate H, passes around an anti-friction roller, L, which is pivoted upon the offset b', beneath the spring-clamp thereon, and is confined between the gripping-segments n n' on the socket-piece of the lever K, when this lever is adjusted in a position to commence a tightening stroke. That portion of the wire which extends from the twister directly around the bale or bundle is now clamped between the nut and anvil on the offset b', and the attendant proceeds to draw the wire tightly around the bale or bundle. When this has been effected the clamp on the offset b is caused to hold the wire which crosses it. The band is now held by both clamps, and it is severed from the wire which extends to the reel by means of the shears above described. The nut-arm G is thrown into gear with the twister-shaft, and this shaft is rotated, which puts the twisted tie into the ends of the band-wire and completes the operation.

It will be seen that the twister-shaft recedes from the bale during its rotation with a speed equal to the pitch of the threads and gage of the wire used, as described. The twists are thus prevented from overriding each other, which would form a knot or kink and fracture the wire at the tie. The twists follow each other regularly until the ends of the bale escape through the eye of the twister, and the tie is completed. The bale is then freed from the clamps. The nut-lever is disengaged from the twister-shaft, and the machine is ready for the commencement of another operation.

Having described my invention, I claim—

1. In a machine for tightening wire about bales and bundles and tying the same, the combination of clamps, a twister, shears, and a lever provided with a tightening-grip, substantially as described.

2. In a wire-band tightener and tyer, the combination of two independent clamps, a perforated twisting-eye, a screw-threaded shaft having this eye fixed to it and provided with a crank-arm, and a detachable nut, substantially as described.

3. The combination of two independent clamps, a rotary twister which forms the tie, a wire-cutter, and means for causing the twister to recede during the operation of twisting the wire, substantially as described.

4. The combination of clamps for the wire, a wire-twister, a tightening-lever, and clamping-segments applied to this lever, substantially as described.

5. The combination of two independent clamps for the bale-wire, a wire-twister to form the twisted tie, a tightening-lever for drawing the wire tightly about the bale or bundle, wire-clamping segments, a stop, and an elastic cushion for one of the segments, substantially as described.

6. The combination of the frame A, the offsets b b', the smooth-bore hub c, the offset d, the clamps, the twister, the shears, and a tightening-lever, substantially as described.

7. The combination of the anti-friction roller L, the clamps, the twister, the shears, and a tightening device, substantially as and for the purpose described.

8. In combination with two independent wire-clamps, a pair of wire-cutting shears, and a wire-tightening device, the arrow-head perforated twister or tyer applied to a shaft which moves endwise during the twisting operation and casts the twists or coils free from each other, substantially in the manner described.

9. The combination, in a wire-band tightener and tyer, of the twister, the clamp on the fixed offset b', and the clamp on the pivoted offset b, substantially as described.

In testimony whereof I affix my signature, in presence of two witnesses, this 14th day of February, 1882.

LEWIS MILLER.

Witnesses:
 H. AUBREY TOULMIN,
 CHAS. D. DAVIS.